US012589658B2

(12) United States Patent
 Takuma

(10) Patent No.: US 12,589,658 B2
(45) Date of Patent: Mar. 31, 2026

(54) ELECTRIC VEHICLE CONTROL DEVICE AND METHOD FOR CONTROLLING ELECTRIC VEHICLE CONTROL DEVICE

(71) Applicant: HITACHI ASTEMO, LTD., Hitachinaka (JP)

(72) Inventor: Hiroaki Takuma, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 126 days.

(21) Appl. No.: 18/264,621

(22) PCT Filed: Sep. 30, 2021

(86) PCT No.: PCT/JP2021/036327
 § 371 (c)(1),
 (2) Date: Aug. 8, 2023

(87) PCT Pub. No.: WO2022/172502
 PCT Pub. Date: Aug. 18, 2022

(65) Prior Publication Data
 US 2024/0109427 A1 Apr. 4, 2024

(30) Foreign Application Priority Data
 Feb. 12, 2021 (JP) ................................. 2021-020885

(51) Int. Cl.
 *B60L 15/20* (2006.01)
 *B60L 58/12* (2019.01)

(52) U.S. Cl.
 CPC .............. *B60L 15/20* (2013.01); *B60L 58/12* (2019.02); *B60L 2240/12* (2013.01); *B60L 2240/423* (2013.01); *B60L 2240/485* (2013.01)

(58) Field of Classification Search
 USPC ......................................................... 701/22
 See application file for complete search history.

(56) References Cited

U.S. PATENT DOCUMENTS

| | | | |
|---|---|---|---|
| 2009/0023548 A1 | 1/2009 | Imamura et al. | |
| 2012/0245781 A1* | 9/2012 | Kanamori ............... | B60L 58/24 180/65.265 |
| 2015/0217645 A1* | 8/2015 | Imamura ............. | B60L 15/2054 701/22 |

FOREIGN PATENT DOCUMENTS

| | | |
|---|---|---|
| JP | 2009-23398 A | 2/2009 |
| JP | 2010-815 A | 1/2010 |

(Continued)

OTHER PUBLICATIONS

International Search Report with English Translation and Written Opinion dated Nov. 16, 2021 in corresponding International Patent Application No. PCT/JP2021/036327 (8 pages).

*Primary Examiner* — Adam D Tissot
(74) *Attorney, Agent, or Firm* — Foley & Lardner LLP

(57) ABSTRACT

An electric vehicle control device that controls a vehicle traveling via a transmission coupled to a plurality of electric motors as a drive source, the electric vehicle control device including: a controller configured to control a first electric motor and a second electric motor that are in contact with a first transmission and a second transmission incorporating a liquid medium, respectively, in which in a heating period in which the first transmission or the second transmission is heated, the controller drives and controls one of the first electric motor and the second electric motor with a powering torque obtained by increasing a heating component torque to a required torque of the electric motor, and controls an other of the first electric motor and the second electric motor with a torque obtained by subtracting the heating component torque from the required torque of the electric motor.

6 Claims, 6 Drawing Sheets

(56)               References Cited

FOREIGN PATENT DOCUMENTS

JP          2011-27246  A      2/2011
JP          2016178842  A  *  10/2016

* cited by examiner

*FIG. 3*

ELECTRIC VEHICLE CONTROL DEVICE AND METHOD FOR CONTROLLING ELECTRIC VEHICLE CONTROL DEVICE

TECHNICAL FIELD

The present invention relates to an electric vehicle control device and a method for controlling the electric vehicle control device.

BACKGROUND ART

An electric vehicle that travels a vehicle using an electric motor as a drive source has been put into practical use. A transmission is coupled to an output shaft of an electric motor of the electric vehicle, and the transmission is coupled to a drive wheel of the vehicle. The transmission includes a large number of gears, and includes a liquid medium such as oil therein. However, at a low temperature of the transmission, the viscosity of the liquid medium of the transmission increases, and a frictional force is applied to the gears.

PTL 1 discloses a technique in which, in a hybrid vehicle using an engine and an electric motor as power sources, when a transmission that transmits the power of the engine to wheels is in a cold state, one of a first electric motor and a second electric motor is caused to function as a generator and the other is caused to function as a power source, and the other electric motor is operated by electric power generated by the one electric motor to form a power circulation state in which the other electric motor drives the one electric motor via the transmission, thereby warming the transmission.

CITATION LIST

Patent Literature

PTL 1: JP 2010-815 A

SUMMARY OF INVENTION

Technical Problem

The technique of PTL 1 does not consider an electric vehicle that causes a vehicle to travel using a plurality of electric motors as drive sources, and the electric cost of the electric vehicle deteriorates.

Solution to Problem

An electric vehicle control device according to the present invention is an electric vehicle control device that controls a vehicle traveling via a transmission coupled to a plurality of electric motors as a drive source, the electric vehicle control device including: a controller configured to control a first electric motor and a second electric motor that are in contact with a first transmission and a second transmission incorporating a liquid medium, respectively, in which in a heating period in which the first transmission or the second transmission is heated, the controller drives and controls one of the first electric motor and the second electric motor with a powering torque obtained by increasing a heating component torque to a required torque of the electric motor, and controls an other of the first electric motor and the second electric motor with a torque obtained by subtracting the heating component torque from the required torque of the electric motor.

A method for controlling an electric vehicle control device according to the present invention is a method for controlling an electric vehicle control device that controls a vehicle traveling via a transmission coupled to a plurality of electric motors as a drive source, in which the transmission includes a first transmission and a second transmission each incorporating a liquid medium, the electric motor includes a first electric motor and a second electric motor that are in contact with the first transmission and the second transmission, respectively, and in a heating period in which the first transmission or the second transmission is heated, one of the first electric motor and the second electric motor is driven and controlled with a powering torque obtained by increasing a heating component torque to a required torque of the electric motor, and an other of the first electric motor and the second electric motor is controlled with a torque obtained by subtracting the heating component torque from a required torque of the electric motor.

Advantageous Effects of Invention

According to the present invention, it is possible to promote heating of the liquid medium in the transmission and to suppress deterioration of electric cost of the electric vehicle.

BRIEF DESCRIPTION OF DRAWINGS

FIG. 3 is a cross-sectional view illustrating another example of the first electric motor and the first transmission.

DESCRIPTION OF EMBODIMENTS

Figure 1:
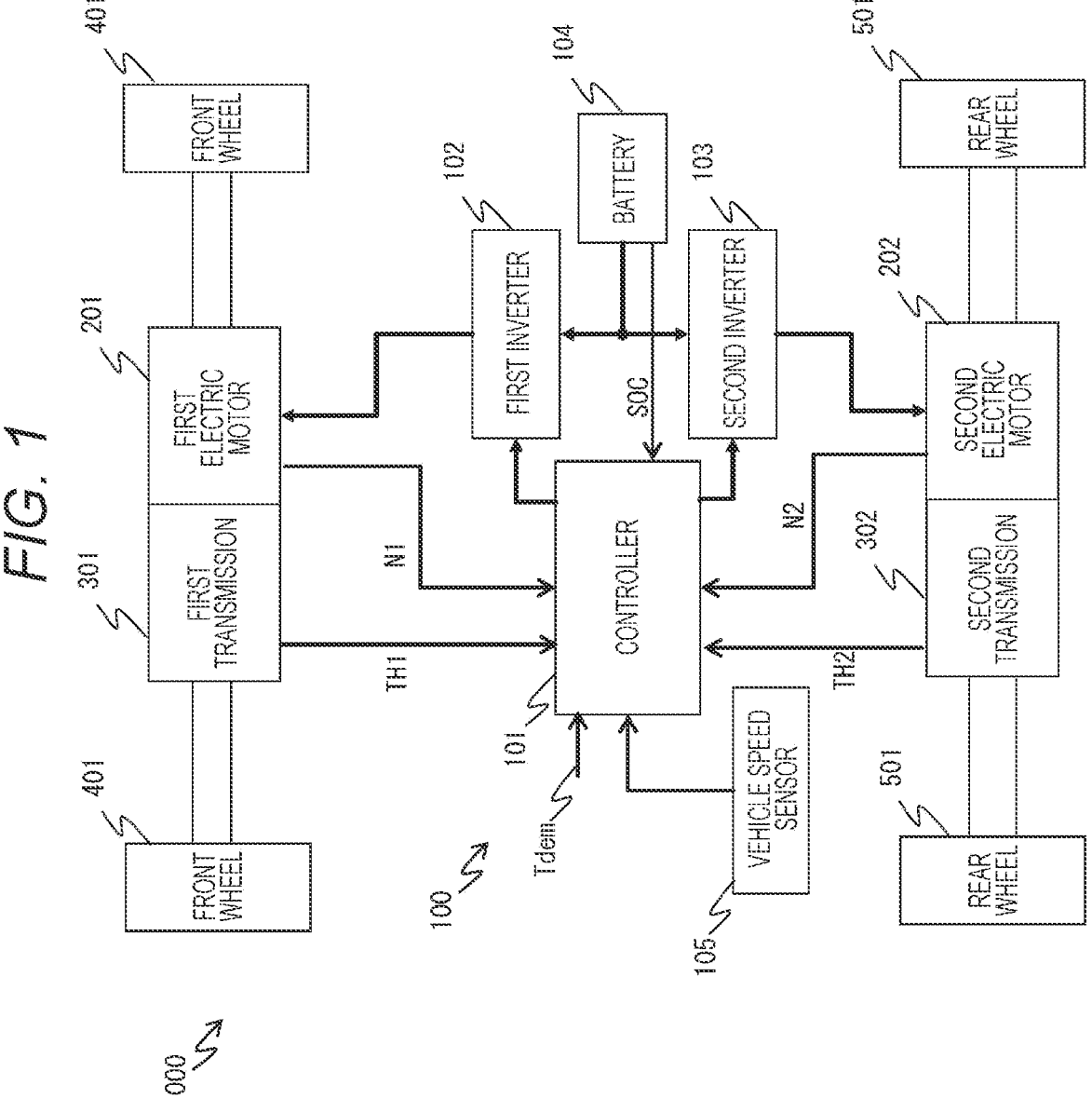
FIG. 1 is a configuration diagram of an electric vehicle including an electric vehicle control device.

Hereinafter, embodiments of the present invention will be described with reference to the drawings. The following description and drawings are exemplifications for describing the present invention, and are omitted and simplified as appropriate for clarification of the description. The present invention can be implemented in other various forms. Unless otherwise limited, each component may be singular or plural.

The position, size, shape, range, and the like of each component illustrated in the drawings may not necessarily represent the actual position, size, shape, range, and the like, in order to facilitate understanding of the invention. For this reason, the present invention is not necessarily limited to the position, size, shape, range, and the like disclosed in the drawings.

When there are a plurality of components having the same or similar functions, different subscripts may be given for the same reference numerals for explanation. However, when there is no need to distinguish between these components, the description may be omitted with subscripts omitted.

In addition, in the following description, a process to be performed by executing a program may be described. However, the program is executed by a processor (for example, a CPU or a GPU) so that a predetermined process is performed while using a storage resource (for example, memory) and/or an interface device (for example, communication port). Therefore, the subject of the process may be the processor. Similarly, the subject of the process performed by executing the program may be a controller, an apparatus, a system, a computer, or a node, which have a processor. The subject of the process performed by executing the program may be an arithmetic unit, and may include a dedicated circuit (for example, an FPGA or an ASIC) for performing a specific process.

The program may be installed on a device such as a computer from a program source. The program source may be, for example, a program distribution server or a computer-readable storage medium. In a case where the program source is a program distribution server, the program distribution server includes a processor and a storage resource for storing the program to be distributed, and the processor of the program distribution server may distribute the program to be distributed to another computer. In addition, in the following description, two or more programs may be expressed as one program, or one program may be expressed as two or more programs.

FIG. 1 is a configuration diagram of an electric vehicle 1000 including an electric vehicle control device 100.

The electric vehicle 1000 includes a first electric motor 201 and a second electric motor 202 which are drive sources. The first electric motor 201 is coupled to a front wheel 401 via a first transmission 301. The second electric motor 202 is coupled to a rear wheel 501 via a second transmission 302. Although not illustrated, a steering wheel, an accelerator, a brake, and a mechanism for controlling these components are provided.

The electric vehicle control device 100 includes a controller 101, a first inverter 102, a second inverter 103, a battery 104, and a vehicle speed sensor 105.

The controller 101 receives a system required torque Tdem for the electric vehicle 1000 from the outside in response to an accelerator operation. The first transmission 301 and the second transmission 302 are respectively provided with sensors that detect the temperature of a liquid medium such as oil in the first transmission 301 and the second transmission 302, and temperatures TH1 and TH2 are input from the sensors to the controller 101. Further, the first electric motor 201 and the second electric motor 202 are provided with sensors for detecting the rotational speed, and rotational speeds N1 and N2 are input from the sensors to the controller 101. In addition, the controller 101 detects a state of charge (SOC) of the battery 104.

The controller 101 appropriately distributes the system required torque Tdem to a required torque Tdem1 to the first electric motor 201 and a required torque Tdem2 to the second electric motor 202. The controller 101 controls the first inverter 102 and the second inverter 103 according to the required torques Tdem1 and Tdem2, the temperatures TH1 and TH2, and the rotational speeds N1 and N2, and controls driving or regeneration of the first electric motor 201 and the second electric motor 202.

The first inverter 102 converts DC power of the battery 104 into AC power, and applies an AC current to the first electric motor 201 to drive the first electric motor 201. Then, the front wheel 401 is rotated via an axle coupled to the first electric motor 201. At the time of regeneration, the first electric motor 201 is caused to function as a generator, and AC power generated by power generation of the first electric motor 201 rotated by the rotational force of the front wheel 401 is converted into DC power by the first inverter 102 to charge the battery 104. The first inverter 102 includes a power semiconductor element therein, and converts power by switching the power semiconductor element.

The second inverter 103 converts DC power of the battery 104 into AC power and applies an AC current to the second electric motor 202 to drive the second electric motor 202. Then, the rear wheel 501 is rotated via an axle coupled to the second electric motor 202. At the time of regeneration, the second electric motor 202 is caused to function as a generator, and AC power generated by power generation of the second electric motor 202 rotated by the rotational force of the rear wheel 501 is converted into DC power by the second inverter 103 to charge the battery 104. The second inverter 103 includes a power semiconductor element therein, and converts power by switching the power semiconductor element.

Although details will be described later, during the heating period for heating the first transmission 301 or the second transmission 302, the controller 101 drives and controls one of the first electric motor 201 or the second electric motor 202 with the powering torque obtained by increasing the heating component torque to the required torque, and performs regenerative control of the other one of the first electric motor 201 or the second electric motor 202 with the regenerative torque corresponding to the heating component torque.

Figure 2:
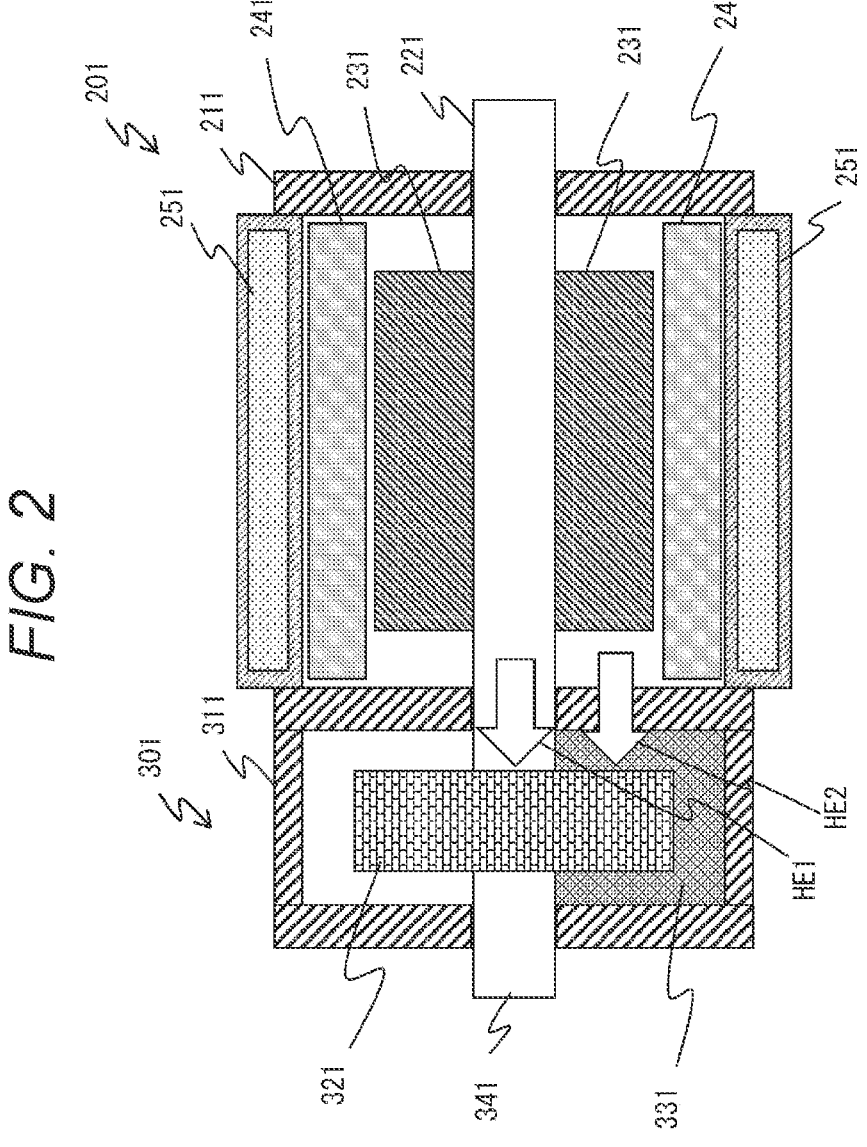
FIG. 2 is a cross-sectional view illustrating an example of a first electric motor and a first transmission.

FIG. 2 is a cross-sectional view illustrating an example of the first electric motor 201 and the first transmission 301.

The first electric motor 201 includes a rotor 231, a stator 241, and a cooler 251 in a housing 211. The rotor 231 is fixed to a rotating shaft 221. The cooler 251 is provided to surround the stator 241 in proximity to the stator 241, and cools the first electric motor 201 by circulating cooling water inside. Although not illustrated, the first electric motor 201 is provided with a sensor that detects the rotational speed of the rotor 231.

The first transmission 301 is provided in contact with the first electric motor 201. That is, the housing 211 of the first electric motor 201 is in contact with a housing 311 of the first transmission 301. The first transmission 301 incorporates a gear coupled to the rotating shaft 221 of the first electric motor 201 and a plurality of gears 321 coupled to the gear, and is finally coupled to an output shaft 341. The output shaft 341 is coupled to the front wheel 401 via a clutch and an axle. A liquid medium 331 such as oil for lubricating the gear 321 is disposed in the first transmission 301. Although not illustrated, a sensor that detects the temperature of the liquid medium 331 is provided in the first transmission 301.

At a low temperature of the first transmission 301, the viscosity of the liquid medium 331 increases, and a frictional force is applied to the gear. Therefore, the electric cost of the electric vehicle 1000 deteriorates. In the present embodiment, the heat of the first electric motor 201 provided in contact with the first transmission 301 is transmitted through a path HE1 via the rotating shaft 221 and a path HE2 via the housing 211 by the control described later. As a result, the temperature of the liquid medium 331 of the first transmission 301 is increased, and deterioration of the electric cost of the electric vehicle 1000 is suppressed.

Although FIG. 2 illustrates an example of the first electric motor 201 and the first transmission 301, the second electric motor 202 and the second transmission 302 have the same configuration.

Figure 3:
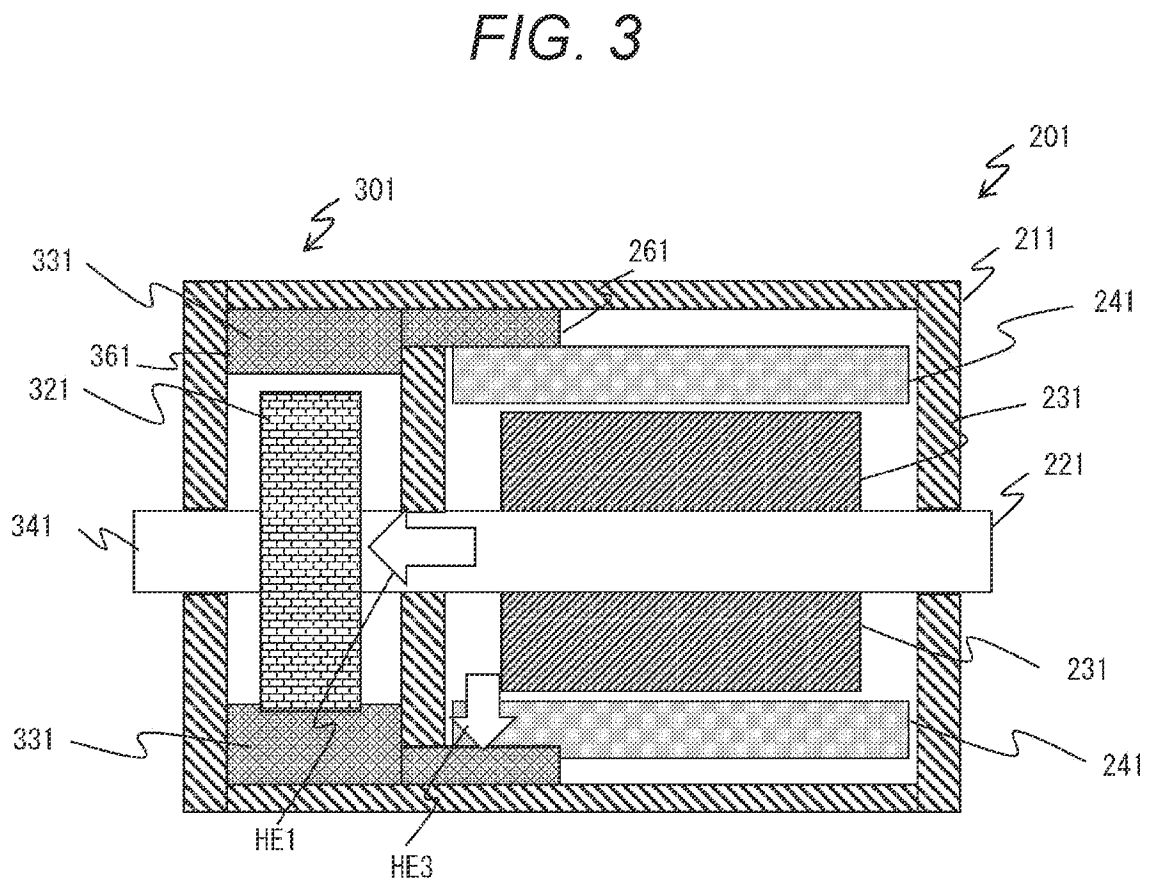

FIG. 3 is a cross-sectional view illustrating another example of the first electric motor 201 and the first transmission 301. The difference from the example illustrated in FIG. 2 is that the liquid medium 331 is shared and circulated inside the first transmission 301 and the first electric motor 201. The same portions as those in FIG. 2 are denoted by the same reference numerals, and the description thereof will be simplified.

The liquid medium 331 is also stored in oil pans 361 and 261 provided in the first transmission 301 and the first electric motor 201, and circulates from the inside of the first transmission 301 to the inside of the first electric motor 201 by a circulation pump or natural circulation (not illustrated). That is, since the first electric motor 201 and the first transmission 301 are in contact with each other and the liquid medium 331 in the first transmission 301 circulates in the first electric motor 201, the heat of the first electric motor 201 is transmitted from the path HE1 through the rotating shaft 221 or the path HE3 through the liquid medium 331. As a result, the temperature of the liquid medium 331 of the first transmission 301 is increased, and deterioration of the electric cost of the electric vehicle 1000 is suppressed.

Although FIG. 3 illustrates an example of the first electric motor 201 and the first transmission 301, the second electric motor 202 and the second transmission 302 have the same configuration. A sensor that detects the temperature of the liquid medium 331 in the second transmission 302 is provided.

Figure 4:
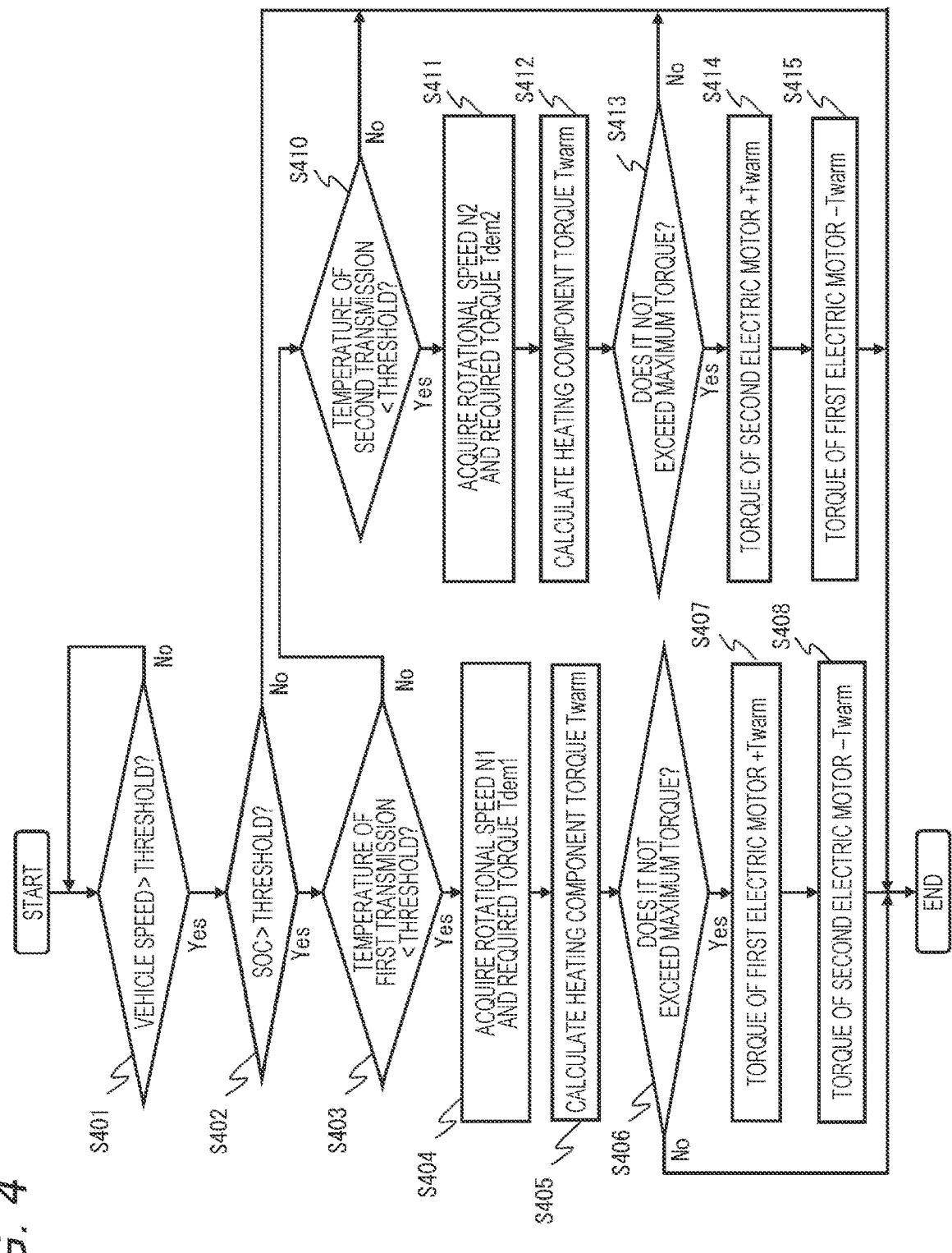
FIG. 4 is a flowchart illustrating a processing operation of a controller.

FIG. 4 is a flowchart illustrating a processing operation performed by the controller 101 executing a program. The controller 101 performs heating control of heating the liquid medium 331 by executing the processing operation of the flowchart illustrated in FIG. 4.

In step S401, it is determined whether the vehicle speed of the electric vehicle 1000 exceeds a threshold based on the vehicle speed sensor 105. When the vehicle speed does not exceed the threshold immediately after the electric vehicle 1000 starts, the heating control of the first transmission 301 and the second transmission 302 is not performed. This is because the starting force is increased using the driving torque of both the first electric motor 201 and the second electric motor 202 immediately after starting. When it is determined in step S401 that the vehicle speed exceeds the threshold, the process proceeds to step S402.

In step S402, a state of charge (SOC) of the battery 104 is detected, and it is determined whether the SOC exceeds a threshold. When the SOC of the battery 104 does not exceed the threshold, the heating control to apply a load to the battery 104 is not performed, and the flowchart of FIG. 4 ends. When it is determined in step S402 that the SOC exceeds the threshold, the process proceeds to step S403.

In step S403, it is determined whether the temperature TH1 from the sensor that detects the temperature of the liquid medium 331 of the first transmission 301 is lower than a threshold. In a case where it is determined to be low, the process proceeds to step S404. When the temperature of the liquid medium 331 of the first transmission 301 is low, the viscosity of the liquid medium 331 increases, a frictional force is applied to the gear of the first transmission 301, and the electric cost of the electric vehicle 1000 deteriorates. In order to suppress this, the liquid medium 331 is heated by the processing of the following steps.

In step S404, the required torque Tdem1 distributed to the first electric motor 201 and the rotational speed N1 of the first electric motor 201 are acquired from the system required torque Tdem input in response to the accelerator operation.

Then, in the next step S405, a heating component torque Twarm is calculated. The heating component torque Twarm is a torque for increasing the heat of the first electric motor 201 by driving the first electric motor 201 with a torque higher than the required torque Tdem1 to increase the temperature of the liquid medium 331 of the first transmission 301 more quickly. The heating component torque Twarm may be calculated, for example, at a predetermined ratio of the required torque Tdem1 or may be a predetermined value.

Figure 5:
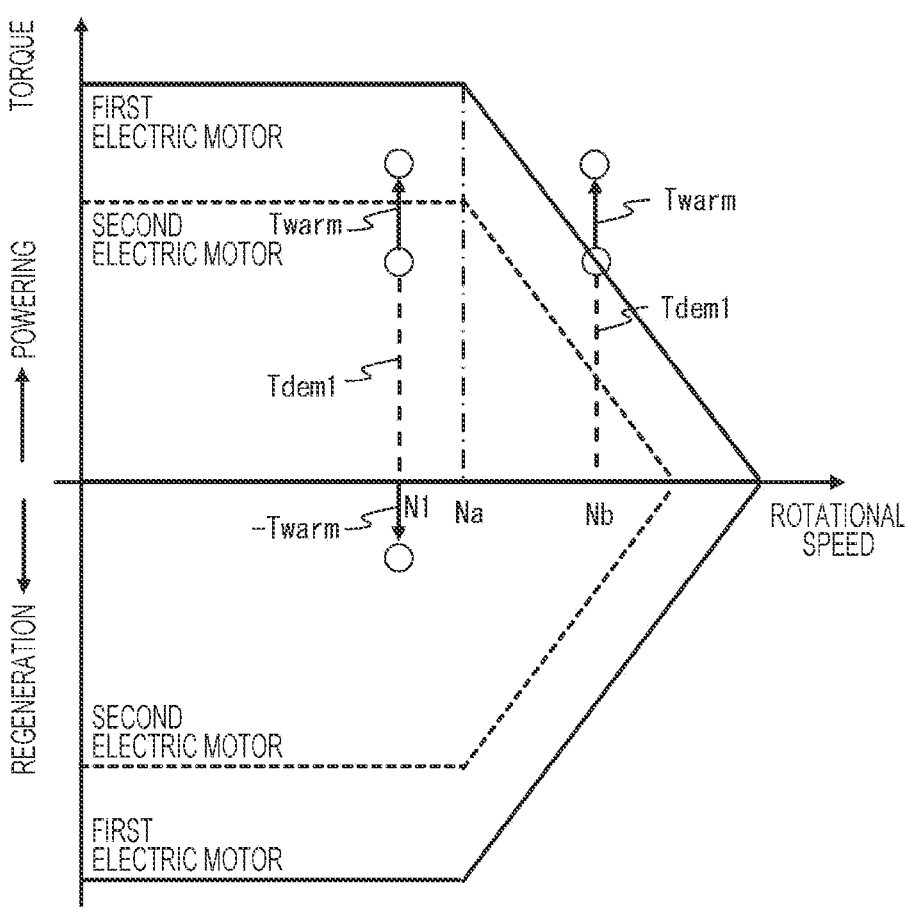
FIG. 5 is a graph illustrating a relationship between a rotational speed of an electric motor and maximum torque.

In next step S406, it is determined whether the torque obtained by adding the heating component torque Twarm to the required torque Tdem1 exceeds the maximum torque of the first electric motor 201. FIG. 5 is referred for description.

FIG. 5 is a graph illustrating a relationship between the rotational speed of the electric motor and the maximum torque. The horizontal axis represents the rotational speed, and the vertical axis represents the torque. The positive side of the vertical axis represents powering, and the negative side represents regeneration. A solid line indicates the maximum output of the first electric motor 201, and a dotted line indicates the maximum output of the second electric motor 202. In this example, the maximum output of the first electric motor 201 is larger than the maximum output of the second electric motor 202. The maximum output is constant up to the rotational speed Na, and decreases when the rotational speed Na is exceeded.

As illustrated in FIG. 5, at the rotational speed N1 of the first electric motor 201, the torque obtained by adding the heating component torque Twarm to the required torque Tdem1 does not exceed the maximum torque of the first electric motor 201. When all the system required torques Tdem are distributed to the required torque Tdem1, the heating component torque Twarm becomes the regenerative torque of the second electric motor 202. On the other hand, at the rotational speed Nb of the first electric motor 201, the torque obtained by adding the heating component torque Twarm to the required torque Tdem1 exceeds the maximum torque of the first electric motor 201. In such a case, it is determined in step S406 that the torque obtained by adding the heating component torque Twarm to the required torque Tdem1 exceeds the maximum torque of the first electric motor 201, heating control is not performed, and the process of FIG. 4 ends.

If the torque obtained by adding the heating component torque Twarm to the required torque Tdem1 does not exceed the maximum torque of the first electric motor 201 in step S406, the process proceeds to step S407.

In step S407, the first electric motor 201 is driven by a torque obtained by adding the heating component torque Twarm to the required torque Tdem1 of the first electric motor 201. As a result, the temperature of the liquid medium 331 of the first transmission 301 can be increased quickly.

In the next step S408, the heating component torque Twarm is subtracted from the required torque Tdem2 distributed to the second electric motor 202 to drive the second electric motor 202. When the required torque Tdem2 is 0, the heating component torque Twarm becomes the regenerative torque of the second electric motor 202, and the energy required for heating is recovered.

As described in steps S407 and S408, the first electric motor 201 performs drive control with the powering torque obtained by increasing the heating component torque Twarm to the required torque Tdem1, and the second electric motor 202 performs regenerative control with the regenerative torque corresponding to the heating component torque Twarm.

The processing illustrated in FIG. 4 is repeatedly executed at predetermined time intervals. As a result, the temperature TH1 of the liquid medium 331 of the first transmission 301 increases. When it is determined in step S403 that the temperature TH1 of the liquid medium 331 in the first transmission 301 is equal to or higher than the threshold, the process proceeds to step S410. Note that a period until the temperature TH1 of the liquid medium 331 of the first transmission 301 becomes equal to or higher than the threshold is referred to as a first heating period.

In step S410, it is determined whether the temperature TH2 from the sensor that detects the temperature of the liquid medium 331 of the second transmission 302 is lower than a threshold. In a case where it is determined to be low, the process proceeds to step S411. When the temperature of the liquid medium 331 of the second transmission 302 is low, the viscosity of the liquid medium 331 increases, a frictional force is applied to the gear of the second transmission 302, and the electric cost of the electric vehicle 1000 deteriorates. In order to suppress this, the liquid medium 331 is heated by the processing of the following steps.

In step S411, the required torque Tdem2 distributed to the second electric motor 202 and the rotational speed N2 of the second electric motor 202 are acquired from the system required torque Tdem input in response to the accelerator operation.

Then, in the next step S412, the heating component torque Twarm is calculated. The heating component torque Twarm is a torque for increasing the heat of the second electric motor 202 by driving the second electric motor 202 with a torque higher than the required torque Tdem2 to increase the temperature of the liquid medium 331 of the second transmission 302 more quickly. The heating component torque Twarm may be calculated, for example, at a predetermined ratio of the required torque Tdem2 or may be a predetermined value.

In the next step S413, it is determined whether the torque obtained by adding the heating component torque Twarm to the required torque Tdem2 exceeds the maximum torque of the second electric motor 202. When it is determined that the maximum torque has been exceeded, the heating control is not performed, and the process of FIG. 4 ends. If the maximum torque has not been exceeded in step S413, the process proceeds to step S414.

In step S414, the second electric motor 202 is driven by a torque obtained by adding the heating component torque Twarm to the required torque Tdem2 of the second electric motor 202. As a result, the temperature of the liquid medium 331 of the second transmission 302 can be increased quickly.

In the next step S415, the heating component torque Twarm is subtracted from the required torque Tdem1 distributed to the first electric motor 201 to drive the first electric motor 201. When the required torque Tdem1 is 0, the heating component torque Twarm becomes the regenerative torque of the first electric motor 201, and the energy required for heating is recovered.

As described in steps S414 and S415, the second electric motor 202 performs drive control with the powering torque obtained by increasing the heating component torque Twarm to the required torque Tdem2, and the first electric motor 201 performs regenerative control with the regenerative torque corresponding to the heating component torque Twarm.

The process illustrated in FIG. 4 is repeatedly executed at predetermined time intervals, and the temperature TH2 of the liquid medium 331 of the second transmission 302 increases. When it is determined in step S410 that the temperature TH2 of the liquid medium 331 in the second transmission 302 is equal to or higher than the threshold, the process ends. A period until the temperature TH2 of the liquid medium 331 of the second transmission 302 becomes equal to or higher than the threshold is referred to as a second heating period. When the second heating period ends, the heating control shown in FIG. 4 ends.

Figure 6:
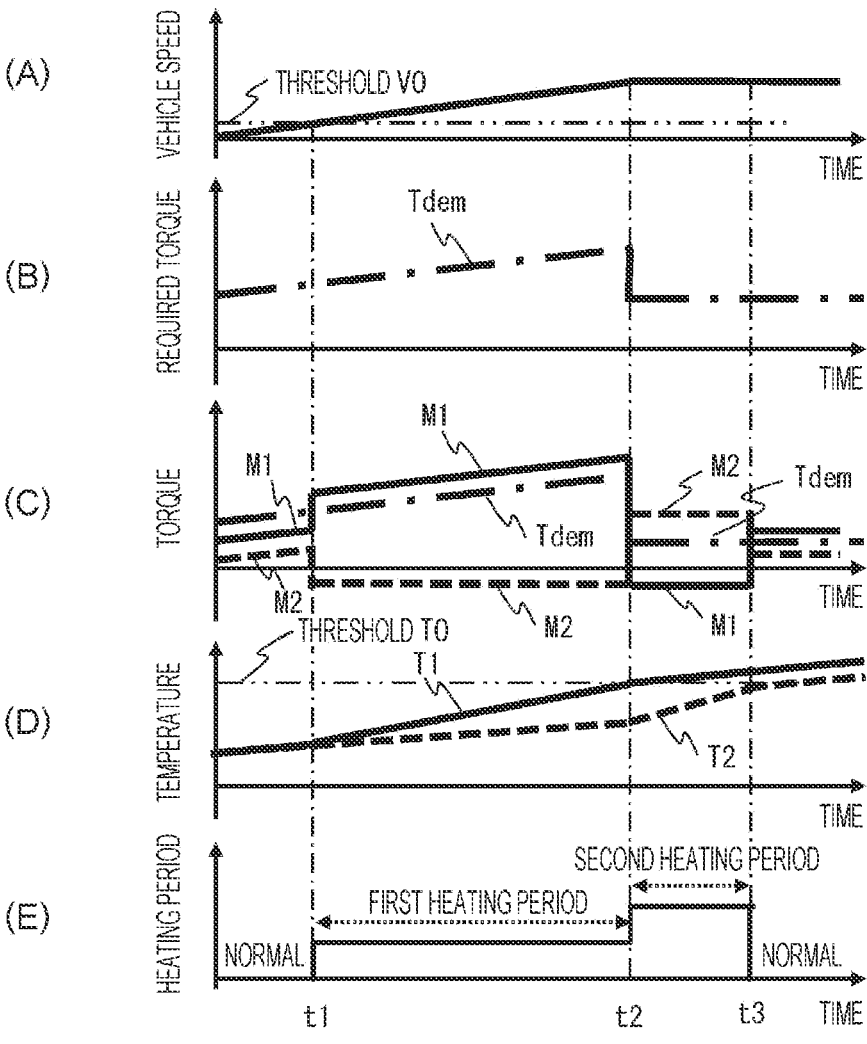
FIGS. 6(A) to 6(E) are graphs illustrating heating control of the electric motor.

FIGS. 6(A) to 6(E) are graphs illustrating heating control of the electric motor. FIG. 6(A) illustrates the vehicle speed, FIG. 6(B) illustrates the required torque, FIG. 6(C) illustrates the torque applied to the electric motor, FIG. 6(D) illustrates the temperature of the liquid medium 331, and FIG. 6(E) illustrates the heating period. In each drawing, the horizontal axis represents time. These graphs show the transition of the heating control described with reference to FIG. 4.

As illustrated in FIG. 6(A), the heating control is not performed until time t1 at which the vehicle speed of the electric vehicle 1000 does not exceed the threshold V0, and the electric vehicle 1000 is driven by normal control. That is, as illustrated in FIG. 6(C), the system required torque Tdem illustrated in FIG. 6(B) is distributed to the first electric motor 201 and the second electric motor 202, and the first electric motor 201 and the second electric motor 202 are driven by a torque M1 and a torque M2, respectively.

When the vehicle speed exceeds a threshold V0 at time t1, as illustrated in FIG. 6(D), when the temperature of the liquid medium 331 is lower than a threshold TO, the heating control of the first electric motor 201 is performed as described with reference to FIG. 4. That is, as illustrated in FIG. 6(C), the first electric motor 201 is driven by the torque M1 obtained by adding the heating component torque Twarm to the required torque Tdem1 of the first electric motor 201. As a result, as illustrated in FIG. 6(D), a temperature T1 of the liquid medium 331 of the first transmission 301 increases. On the other hand, as illustrated in FIG. 6(C), the second electric motor 202 performs regenerative control of the second electric motor 202 with the torque M2 obtained by subtracting the heating component torque Twarm. As illustrated in FIG. 6(D), the first heating period illustrated in FIG. 6(E) continues until the temperature of the liquid medium 331 of the first transmission 301 becomes equal to or higher than the threshold TO.

When the temperature of the liquid medium 331 of the first transmission 301 becomes equal to or higher than the threshold TO at time t2, as illustrated in FIG. 6(C), the second electric motor 202 is driven by the torque M2 obtained by adding the heating component torque Twarm to the required torque Tdem2 of the second electric motor 202. As a result, as illustrated in FIG. 6(D), the temperature T2 of the liquid medium 331 of the second transmission 302 increases. On the other hand, as illustrated in FIG. 6(C), the first electric motor 201 performs regenerative control of the first electric motor 201 with the torque M1 obtained by subtracting the heating component torque Twarm. As illustrated in FIG. 6(D), the second heating period illustrated in FIG. 6(E) continues until the temperature of the liquid medium 331 of the second transmission 302 becomes equal to or higher than the threshold TO.

When the temperature of the liquid medium 331 of the second transmission 302 becomes equal to or higher than the threshold TO at time t3, as illustrated in FIG. 6(C), the heating of the first transmission 301 and the second transmission 302 ends, and the first electric motor 201 and the second electric motor 202 are driven under normal control.

In the present embodiment, the case where the maximum output of the first electric motor 201 is larger than that of the second electric motor 202 has been described as an example. However, the maximum output of the second electric motor 202 may be larger than that of the first electric motor 201. Preferably, heating control is performed first on an electric motor having a large maximum output. In addition, the maximum outputs of the first electric motor 201 and the second electric motor 202 may be the same. In this case, heating control may be performed first. Although the two electric motors have been described as examples, four electric motors corresponding to four wheels of the electric vehicle 1000 may be provided. In this case, the two electric motors corresponding to the front wheels and the two electric motors corresponding to the rear wheels are divided, and heating control is performed in the first heating period and the second heating period, respectively.

In the present embodiment, the heating control is performed on the first electric motor 201 and the second electric motor 202 in the predetermined order. However, the heating control may be performed from an electric motor having a lower temperature of the liquid medium 331 so that the temperature difference between the liquid medium 331 of the first electric motor 201 and the second electric motor 202 becomes small. When powering control needs to be performed by a plurality of electric motors, heating control is not performed.

According to the present embodiment, the temperature of the liquid medium in the transmission is increased by the heat transmitted from the electric motor in the heating period for heating the transmission, so that it is possible to suppress the deterioration of the electric cost of the electric vehicle.

According to the above embodiment, the following operational effects are obtained.

(1) The electric vehicle control device 100 is an electric vehicle control device 100 that controls an electric vehicle 1000 traveling via a transmission coupled to a plurality of electric motors as a drive source, the electric vehicle control device including: a controller 101 configured to control a first electric motor 201 and a second electric motor 202 that are in contact with a first transmission 301 and a second transmission 302 incorporating a liquid medium 331, respectively. In a heating period in which the first transmission 301 or the second transmission 302 are heated, the controller 101 drives and controls one of the first electric motor 201 and the second electric motor 202 with a powering torque obtained by increasing a heating component torque Twarm to required torques Tdem1 and Tdem2 of the electric motor, and controls the other of the first electric motor 201 and the second electric motor 202 with a torque obtained by subtracting the heating component torque Twarm from the required torques Tdem1 and Tdem of the electric motor. As a result, it is possible to promote heating of the liquid medium in the transmission and to suppress deterioration of electric cost of the electric vehicle.

(2) A method for controlling an electric vehicle control device 100 is a method for controlling an electric vehicle control device 100 that controls an electric vehicle 1000 traveling via a transmission coupled to a plurality of electric motors as a drive source. The transmission includes a first transmission 301 and a second transmission 302 each incorporating a liquid medium 331. The electric motor includes a first electric motor 201 and a second electric motor 202 that are in contact with the first transmission 301 and the second transmission 302, respectively. In a heating period in which the first transmission 301 or the second transmission 302 is heated, one of the first electric motor 201 and the second electric motor 202 is driven and controlled with a powering torque obtained by increasing a heating component torque Twarm to required torques Tdem1 and Tdem, and an other of the first electric motor 201 and the second electric motor 202 is controlled with a torque obtained by subtracting the heating component torque Twarm from the required torques Tdem1 and Tdem. As a result, it is possible to promote heating of the liquid medium in the transmission and to suppress deterioration of electric cost of the electric vehicle.

The present invention is not limited to the above embodiments, and includes other forms considered within the scope of the technical ideas of the present invention as long as the features of the present invention are not degraded. In addition, the above embodiments and the plurality of modifications may be combined.

REFERENCE SIGNS LIST

100 electric vehicle control device
101 controller
102 first inverter
103 second inverter
104 battery
105 vehicle speed sensor
201 first electric motor
202 second electric motor
211, 311 housing
221 rotating shaft
231 rotor
241 stator
251 cooler
301 first transmission
302 second transmission
321 gear
331 liquid medium
341 output shaft
401 front wheel
501 rear wheel
1000 electric vehicle
Tdem, Tdem1, Tdem2 required torque
Twarm heating component torque
TH1, TH2 temperature
N1, N2 rotational speed

The invention claimed is:

1. An electric vehicle control device that controls a vehicle traveling via a transmission coupled to a plurality of electric motors as a drive source, the electric vehicle control device comprising:
a controller configured to control a first electric motor and a second electric motor that are in contact with a first transmission and a second transmission incorporating a liquid medium, respectively, wherein
in a heating period in which the first transmission or the second transmission is heated, the controller drives and controls one of the first electric motor and the second electric motor with a powering torque obtained by increasing a heating component torque to a required torque of the electric motor, and controls an other of the first electric motor and the second electric motor with a torque obtained by subtracting the heating component torque from the required torque of the electric motor,
wherein in the heating period in which the first transmission or the second transmission is heated, the controller drives and controls the one of the first electric motor and the second electric motor with the powering torque, and performs regenerative control on the other of the first electric motor and the second electric motor with a regenerative torque corresponding to the heating component torque.

2. An electric vehicle control device that controls a vehicle traveling via a transmission coupled to a plurality of electric motors as a drive source, the electric vehicle control device comprising:

a controller configured to control a first electric motor and a second electric motor that are in contact with a first transmission and a second transmission incorporating a liquid medium, respectively, wherein in a heating period in which the first transmission or the second transmission is heated, the controller drives and controls one of the first electric motor and the second electric motor with a powering torque obtained by increasing a heating component torque to a required torque of the electric motor, and controls an other of the first electric motor and the second electric motor with a torque obtained by subtracting the heating component torque from the required torque of the electric motor, and wherein the controller starts the heating period after a speed of the vehicle exceeds a predetermined threshold.

3. The electric vehicle control device according to claim 2, wherein the controller starts the heating period when a state of charge of a battery that supplies electric power to the first electric motor and the second electric motor exceeds a predetermined threshold.

4. The electric vehicle control device according to claim 3, wherein the controller starts the heating period when a temperature of the liquid medium is lower than a predetermined threshold.

5. The electric vehicle control device according to claim 1, wherein the heating period includes a first heating period and a second heating period, and the controller starts the first heating period to increase a temperature of the liquid medium in the first transmission by heat transmitted from the first electric motor when the temperature of the liquid medium in the first transmission is lower than a predetermined threshold and a speed of the vehicle exceeds a predetermined threshold, and starts the second heating period to increase a temperature of the liquid medium in the second transmission by heat transmitted from the second electric motor when the temperature of the liquid medium in the second transmission is lower than a predetermined threshold and a speed of the vehicle exceeds a predetermined threshold.

6. A method for controlling an electric vehicle control device that controls a vehicle traveling via a transmission coupled to a plurality of electric motors as a drive source, wherein the transmission includes a first transmission and a second transmission each incorporating a liquid medium, the electric motor includes a first electric motor and a second electric motor that are in contact with the first transmission and the second transmission, respectively, and in a heating period in which the first transmission or the second transmission is heated, one of the first electric motor and the second electric motor is driven and controlled with a powering torque obtained by increasing a heating component torque to a required torque of the electric motor, and an other of the first electric motor and the second electric motor is controlled with a torque obtained by subtracting the heating component torque from a required torque of the electric motor, wherein in the heating period in which the first transmission or the second transmission is heated, the one of the first electric motor and the second electric motor is driven and controlled, by a controller, with the powering torque, and the other of the first electric motor and the second electric motor is controlled by the controller to perform regenerative control with a regenerative torque corresponding to the heating component torque.

* * * * *